United States Patent

[11] 3,599,487

[72] Inventor Anthony J. Brigalli
 Fairborn, Ohio
[21] Appl. No. 869,674
[22] Filed Oct. 27, 1969
[45] Patented Aug. 17, 1971
[73] Assignee The United States of America as represented by the Secretary of the United States Air Force

[54] HYPERSONIC WIND TUNNEL THROAT PLUG
 4 Claims, 4 Drawing Figs.
[52] U.S. Cl. .................................................. 73/147
[51] Int. Cl. ........................................... G01m 9/00
[50] Field of Search ........................................ 73/147

[56] References Cited
 UNITED STATES PATENTS
 2,836,063 5/1958 Yoler et al. ................... 73/147
 2,937,523 5/1960 Yoler ........................... 73/147
 3,109,305 11/1963 Kilmer et al. ................. 73/147

*Primary Examiner*—S. Clement Swisher
*Attorneys*—Harry A. Herbert, Jr. and Charles H. Wagner ABSTRACT: A plug which is insertable into the throat of a hypersonic wind tunnel and is yieldably retained therein, and initially completely isolates any relative pressure in a wind tunnel pebble storage heater for supplying heated air, from a vacuum being built up in the wind tunnel test leg section. The plug is insertable into the wind tunnel throat through the wind tunnel nozzle exit area section and comprises a body snugly fitting the throat having an annular resilient sealing and retaining lip which engages the "upstream" end of the throat section to yieldably retain the plug in place in sealed relation against a "hard" vacuum being built up "downstream" in the diffuser and test section of the tunnel until a predetermined pressure differential from the pebble storage heater on the upstream end of the plug builds up and blows the plug out of the throat and into the diffuser section due to the pressure of the heated air from the pebble storage heater.

INVENTOR.
ANTHONY J. BRIGALLI
BY Harry A. Herbert Jr
ATTORNEY

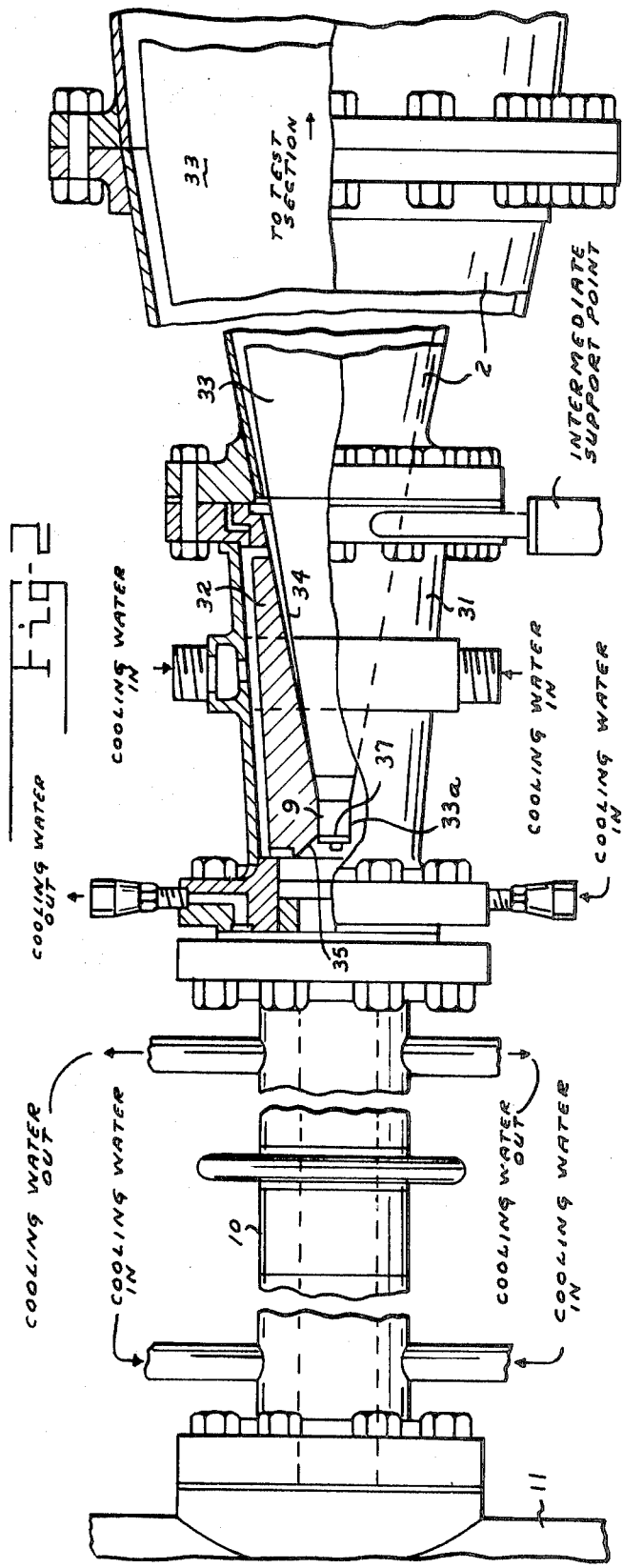
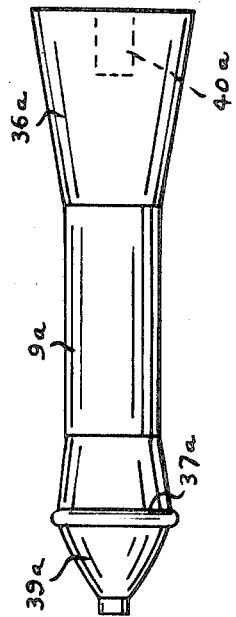
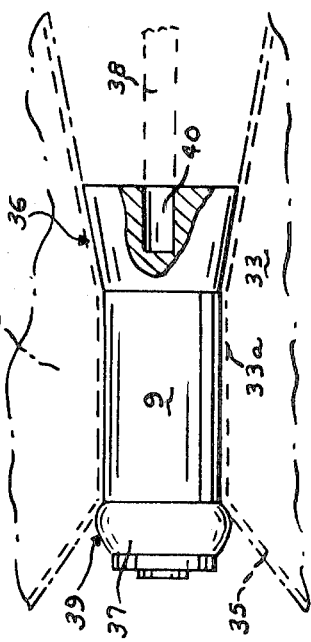

3,599,487

1

HYPERSONIC WIND TUNNEL THROAT PLUG

BACKGROUND OF THE INVENTION

Hypersonic wind tunnels employing air heaters through which air, under considerable heat and pressure, passes into and through the throat area, the diffuser and test sections, assisted by a "hard" vacuum that is initially built up in the diffuser section have previously used large complicated and expensive mechanical valve means to initially isolate the airheater from the diffuser and test section during the time that a hard vacuum was being built up in the test and diffuser sections.

These mechanical valves, also known as "hot valves," were very complicated, occupied considerable space and were very expensive, requiring ample water cooling in order to keep them from burning up during the running of the tunnel. In addition, other valve problems were present, such as the provision of an adequate valve seal which had a water cooled copper seat that became distorted after opening and closing under the pressure and heat on the "upstream" side of the valve, and the desired high vacuum in the diffuser section at the other or downstream side of the valve. Also, abrasion of the mechanical valve from facility contamination was present.

This caused costly maintenance and downtime when these difficulties and failures of these "hot valves" occurred, and prevented satisfactory hypersonic wind tunnel tests and performance.

The invention eliminates the use of these expensive and unsatisfactory hot or high temperature pressure control valves, and comprises a specially designed simple plug member which fits into the hypersonic nozzle throat area and is designed t provide an annular yieldable retaining lip adjacent one end which yieldably retains the plug in place in the throat against a hard vacuum in the test and diffuser section, and at the same time creates a positive seal from the heated air under pressure in the upstream end of the tunnel.

A predetermined increase in the upstream pressure differential against the upstream end of the plug, for instance above 50 p.s.i., over the pressure, or lack of pressure, in the diffuser leg will pop the plug out of the nozzle and into the downstream diffuser so that the facility can operate. In this sense the facility has an automatic actuation feature.

The plug snugly fits the throat and has a conical taper, similar to the wall taper adjacent the downstream side of the nozzle to accurately limit the insertion of the plug in the nozzle or throat with the annular lip disposed at the upstream end of the throat. The annular lip is yieldable upon a predetermined greater differential pressure on the upstream end of the plug to yield and release the plug into the downstream diffuser section, when this pressure is exceeded.

BRIEF DESCRIPTION OF THE DRAWINGS

FIG. 2 is an enlarged, somewhat fragmentary, side view of the nozzle portion of a hypersonic wind tunnel such as shown in FIG. 1, parts being broken away and shown in section, and showing the nozzle throat plug of the invention in position in the throat thereof to isolate the heated air under pressure in the "upstream" portion or section of the tunnel from the "downstream" test and diffuser section while a "hard" vacuum is being built up at the downstream side of the throat and plug.

FIG. 3 is a detail side view of one of the hypersonic wind tunnel throat plugs as used with a particular throat section, for instance for a Mach 8 test, a portion thereof being broken away and shown in section, and a portion of the nozzle throat being shown in dotted lines.

FIG. 4 is a side view in elevation of a throat plug for use in a throat having a different Mach number test, for instance a Mach 12 plug.

2

Figure 1:
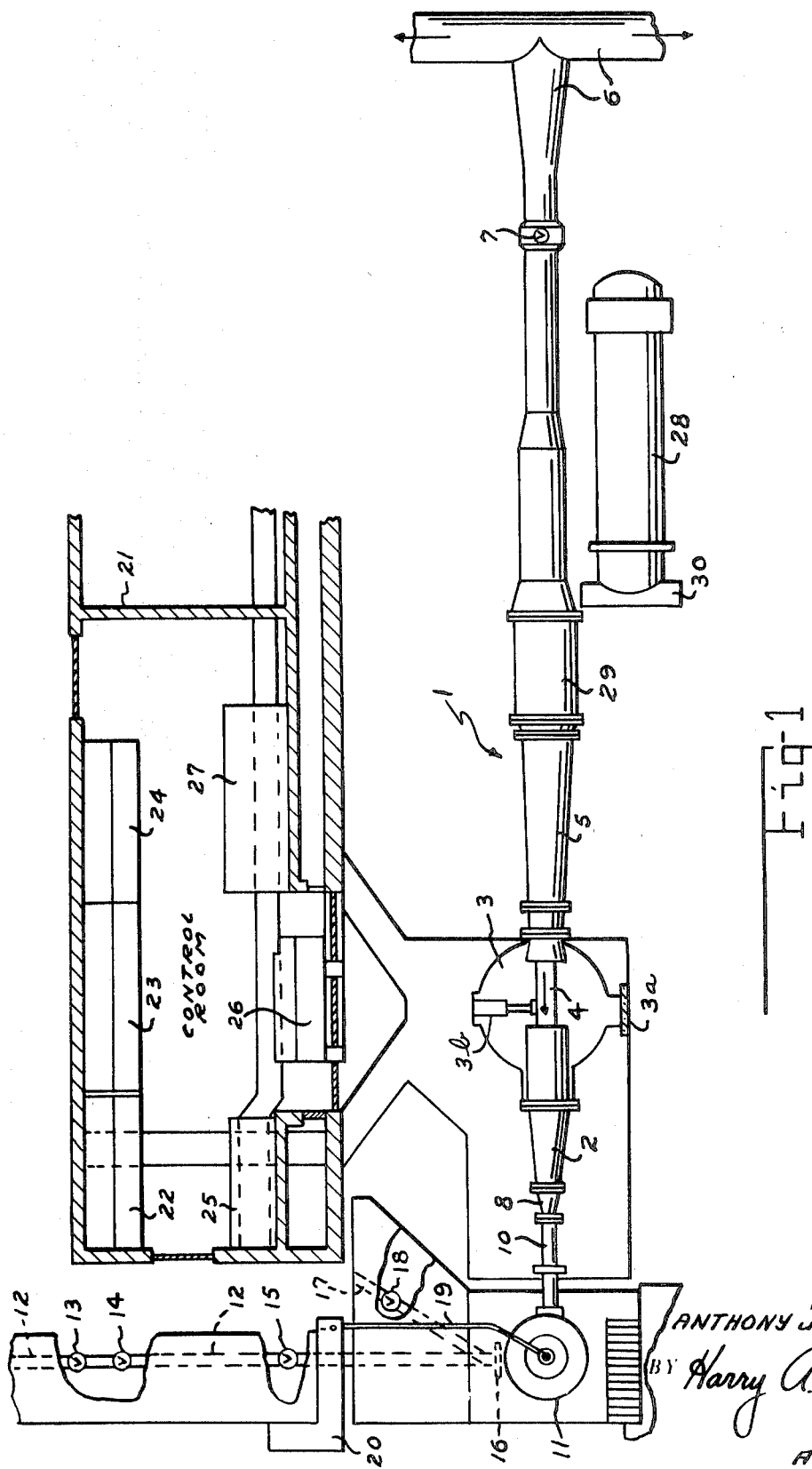
FIG. 1 is a schematic plan view, somewhat diagrammatically illustrating a conventional hypersonic wind tunnel in which the nozzle throat plug is employed, many of the facility control features thereof being omitted.

Referring to the drawings, and more particularly to the hypersonic wind tunnel system shown in FIGS. 1 and 2, the reference numeral 1 denotes generally a hypersonic wind tunnel high temperature facility comprising a nozzle and throat section 2 leading into a test section 3 in which a removable test specimen, as schematically indicated at 4, is placed and includes the provision of a viewing window 3a. A diffuser section 5 extends "downstream" from the test section, and finally discharges into a suitable vacuum exhaust system conduit 6 and may enclose a cooling grid which arrests or catches the plug when projected out of the throat.

Any suitable means is provided for exhausting air from the diffuser, and the test section 3 which includes a vacuum exhaust conduit 6 and a vacuum isolation valve 7 which can be closed to interrupt the application vacuum pressure in the diffuser, or opened to connect the diffuser 5, test section 3, and nozzle 2 with the vacuum exhaust conduit 6 to establish a "hard" vacuum in the downstream side of the throat, with one of the plugs 9 in place in the throat, preliminarily to the starting of the tunnel facility operation.

The nozzle sealing plug indicated at 9 is resilient and initially yieldably retained in the throat portion 8.

As seen in FIG. 2 the throat section 8 is connected to a hollow spool section or member 10 which, in turn, is connected to means for heating the air when delivered under high pressure from a suitable high-pressure source. The heating means preferably comprises what is known as a "pebble bed heater" 11 which is heated by a suitable burner, and the heated air under high pressure is discharged through the heater 11 into the spool conduit 10.

The air to be heated is supplied to the pebble bed heater 11 by a pressure supply conduit 12 having a quick closing isolation valve 13 therein followed downstream therefrom by a preregulator valve 14 and a "mass flow" control valve 15, with the air supply conduit leading therefrom into the pebble bed heater at 16.

Suitable burners are provided in the pebble bed heater 11 which have a burner exhaust system 17 that is valve controlled at 18, and fuel supply conduit means indicated at 19 is controlled from a schematically shown burner control panel 20.

The numeral 21 denotes a control room having a data monitoring system bench 22, a data conditioning console 23, a model pressure registering system 24, an instrumentation console 25, diffuser pressure measuring controls 26, and the facility control console 27 therein.

Since the hypersonic tunnel facility is water cooled, suitable water pumps are provided which also include a water/water heat exchanger 28, an air/water heat exchanger 29, and circulation pumps 30 of suitable capacity.

While the above describes a conventional hypersonic high-temperature wind tunnel facility arrangement generally, this arrangement formerly employed what was known as the "hot valve," previously referred to, which was disposed between the pebble bed heater 11 and the spool section 10, and comprised a large and very costly mechanical valve that required cooling in order to prevent it from burning up during the running of the tunnel. Many other difficulties were experienced with this "hot valve," such as the seal. This mechanical valve had a water cooled copper valve seat which became distorted when opening and closing under heat and pressure, and the very high vacuum initially required in the diffuser and test sections 5 and 3 could not be obtained because of leakage.

Referring more particularly to FIGS. 2 to 4, the invention comprises a specially designed resilient plug, indicated at 9, which completely dispensed with the hot valve, its expense, its difficulties, objections and faults. The throat section 8, as shown in FIG. 2, comprises an outer barrel or sleeve, preferably of conical shape and indicated at 31, which encloses a removable conical backup block or sleeve 32, preferably made of aluminum which concentrically supports the end of the nozzle liner 33 at the throat section 33a thereof. The liner 33 and backup sleeve 32 taper outwardly "- downstream" away from the throat 33a as indicated at 34 and taper upstream at 35 at the opposite end of the cylindrical throat, and the plug 9, when the plug is inserted in the throat 8.

The plug 9 is preferably made of a resilient material, such as hard silicone rubber and is basically cylindrical, measuring about 0.005 inch under the diameter of the nozzle throat 8 and is formed with a conical flare 36 at its downstream end to fit and seat on the conical inner wall 34 of the nozzle liner 33, and is also formed with an annular resilient sealing and retaining lip 37 at its opposite end to provide an annular resilient retaining bead or lip which seats and seals against the conical upstream end of the liner throat 33a, the upstream end of the liner being outwardly tapered, as indicated at 35.

The throat plug 9 is easily inserted from the test cabin 3 (with the test specimen moved out of the way), by a suitable pole or ramrod, indicated at 38. This rod 38 may be inserted in a suitable socket 40 provided in the downstream end or back side of the plug. Once the plug is forced into the cylindrical throat portion 33a to dispose the annular sealing lip 37 beyond the throat, it then seals off the pebble bed heater 11 from the downstream test leg. This isolation permits those who may be making model changes and adjustments of the test specimen in the test cabin 3 to do so without fear of leakage, and prevents inhalation of the exhaust products from the burner while the same is heating the pebble bed unit 11. It also acts as an automatic valve.

When preparing to run the tunnel facility the burner, such as a propane burner, for the pebble bed heater, is turned off. With the sealing plug 9 in place the test leg is evacuated to a "-hard" vacuum, for instance of 130 microns to one-half millimeter of mercury by opening vacuum isolation valve 7 to the high-vacuum source in and connected to the conduits 6 and the tunnel is ready to run. High-pressure air is then let into the pebble storage heater 11 and heated thereby until the prescribed predetermined pressure "buildup" is reached in the upstream end of the nozzle 8 and the plug 9 is blown out of the nozzle 33a and passes through the test cabin preferably with the test specimen moved out of its path, and projected into the diffuser section 5. The plug is small, looses its inertia rapidly. It can pass below the test specimen 4, or the test specimen can be temporarily withdrawn out of its path by suitable means, such as a piston and plunger 36, as schematically shown in FIG. 1. The test specimen 4 can then be returned into position as the tunnel starts to run. The pressure in the storage heater 11 continues to rise to its maximum pressure to provide the desired hypersonic airflow, assisted by the vacuum which is supplied from the connected exhausts 6, and their connected vacuum source.

Once the test or run is completed, the sealing plug 9, which falls in the diffuser after bouncing around, is or may be arrested from further movement out of the diffuser 5 by air cooling coils not shown but conveniently located in the diffuser to cool the air further after it leaves the test cabin 3.

The diffuser section 5 may be provided with a suitable opening or trap door (not shown) so that the sealing plug 9 may be retrieved and reinstalled in the throat for the next test cycle or tunnel run.

The plug geometry is designed so that the resilient retaining lip 37 holds the plug in place against a hard vacuum, and at the same time the annular lip 37 creates a positive seal between the upstream and downstream ends of the throat. However a predetermined relative increase in the upstream pressure, for instance above 50 p.s.i. will pop the plug out of the throat nozzle 33a so that the facility can operate. The plug 9 therefore provides a very satisfactory pressure seal and valve, and completely eliminates the unsatisfactory, very expensive and complicated, "hot valve" formerly used between the pebble bed heater 11 and the spool section 10 that was supposed to isolate the pebble bed heater 11 from the vacuum being built up between the downstream side of the throat, the plug 9 providing means for automatically releasing the hot and pressurized air from the heater when a predetermined pressure is built up behind the upstream end of the plug.

The tapered skirt portion 36 prevents the plug from being shoved too far into the throat, while the tapered front end or nose 39 provides centering and camming means for compressing the annular lip 37 as the plug is forced forwardly into and through the throat 33a of the liner 33. Suction in the downstream test and diffuser section will cause the plug to be drawn back slightly to firmly seat and seal the annular lip 37 tightly against the upstream end of the throat 33a until a sufficient predetermined pressure differential against the upstream end of the plug pops the plug out of the throat by compressing the annular lip 37 inwardly in the tapered upstream end 35 of the liner 33.

The plug 9 may be provided with a suitable socket 40 to receive the ram or push rod 38 for inserting the plug 9 into the liner nozzle throat 33a.

When employing the tunnel facility for a different Mach number test, the liner 33 and backup block or sleeve 32 must be changed to vary the size, shape and throat taper. This requires a different sealing plug, for instance FIG. 4 of the drawings illustrates a Mach 12 plug having a tapered front end or insertion nose portion 39a formed with an annular lip 37a, and a throat fitting intermediate portion 9a, with the downstream tapered end portion or skirt 36a preferably having a socket 40a for receiving the push or ramrod, similar to the rod 38 (FIG. 3), for inserting the plug through the throat into its sealing relation with the liner.

For purposes of exemplification, a particular embodiment of the invention has been shown and described to the best understanding. However, it will be apparent that minor changes and modifications in the arrangement and construction of the parts thereof may be resorted to without departing from the true spirit and scope of the invention as set forth in the accompanying claims.

I claim:

1. In a hypersonic wind tunnel having a throat with a converging fluent material pressure inlet, pressure supply means for supplying a fluent material under pressure to said inlet, said throat having a diverging nozzle extending downstream from said inlet, a diffuser disposed in aligned spaced relation from the end of said nozzle, an enclosing test section adapted to receive a test specimen between said nozzle and said diffuser, said test specimen movable into and out of aligned relation between the nozzle and diffuser ends, a pressure sealing removable plug member comprising a body snugly fitting said throat having an annular yieldable resilient outstanding pressure sealing lip encircling said body in pressure sealing contact with the upstream end of said throat, said lip calibrated to yield inwardly and release said plug member for downstream movement out of said throat upon application of predetermined greater upstream differential pressure of said fluent material on the upstream end of said plug member than pressure on the downstream end of said plug member to permit flow of fluent material from said pressure supply means through said throat, nozzle, test section and diffuser.

2. A hypersonic wind tunnel as set forth in claim 1, in which said yieldable resilient lip of said plug member projects outwardly from the upstream end of the body and is compressible inwardly by insertion and passage of said plug into and through said throat from the downstream end of said throat, said resilient lip being expansible outwardly after passage thereof through and beyond the upstream end of the throat, and movable into abutting and sealing relation against the upstream end of the throat to resist downstream return movement of said plug member in said throat, said resilient yieldable annular lip calibrated to yield inwardly by downstream movement of said plug member in said throat by application of predetermined pressure of said fluent material from said pressure supply means against the upstream end of said plug and free said plug for movement out of said throat to free said fluent material for discharge through said throat, nozzle, test section and diffuser.

3. A hypersonic wind tunnel as set forth in claim 1 in which said plug member is formed with a conical outwardly flared downstream end portion adapted to engage the wall of the downstream diverging nozzle, adjacent the downstream end of said throat when inserted in and through said throat and limit the upstream insertion movement of said plug member into said throat to a position where the annular compressible resilient lip passes through said throat, beyond the upstream end thereof.

4. In a hypersonic wind tunnel as set forth in claim 3 in which said plug member is resilient and comprises a body formed with an annular constricted nose portion located upstream ahead of said annular resilient yieldable lip and includes a forwardly inclined annular leading edge portion disposed for contacting engagement with the downstream end of the nozzle, to center the plug member, and cam said resilient lip inwardly toward the body, as the plug member is forced into the throat.